United States Patent
Maezawa et al.

(10) Patent No.: US 7,070,916 B2
(45) Date of Patent: Jul. 4, 2006

(54) RADIATION IMAGE CONVERSION PANEL AND PRODUCTION METHOD THEREOF

(75) Inventors: Akihiro Maezawa, Hino (JP); Kuniaki Nakano, Uenohara-machi (JP); Osamu Morikawa, Hachioji (JP); Katsuya Kishinami, Hachioji (JP); Noriyuki Mishina, Ome (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 10/930,817

(22) Filed: Sep. 1, 2004

(65) Prior Publication Data

US 2005/0051737 A1    Mar. 10, 2005

(30) Foreign Application Priority Data

Sep. 5, 2003   (JP)   ............... 2003-313693

(51) Int. Cl.
*G03C 1/725* (2006.01)
*G03C 1/74* (2006.01)
*G03C 5/17* (2006.01)
*G03B 42/08* (2006.01)
*C23C 16/00* (2006.01)

(52) U.S. Cl. ............... 430/496; 430/21; 430/139; 250/484.4; 427/255.6; 427/255.394; 427/385.5

(58) Field of Classification Search ............ 427/255.6, 427/255.394, 385.5; 250/484.4; 430/21, 430/139, 496
See application file for complete search history.

(56) References Cited

U.S. PATENT DOCUMENTS

| | | | |
|---|---|---|---|
| 4,624,867 A * | 11/1986 | Iijima et al. | 427/255.6 |
| 4,759,958 A * | 7/1988 | Numata et al. | 427/255.6 |
| 4,947,046 A | 8/1990 | Kawabata et al. | |
| 4,999,215 A * | 3/1991 | Akagi et al. | 427/488 |
| 6,939,576 B1 * | 9/2005 | Deshpande et al. | 427/223 |
| 2003/0155529 A1 | 8/2003 | Morikawa et al. | |
| 2004/0016890 A1 * | 1/2004 | Maezawa et al. | 250/484.4 |
| 2004/0041100 A1 * | 3/2004 | Maezawa et al. | 250/484.4 |
| 2004/0159801 A1 * | 8/2004 | Kishinami et al. | 250/484.4 |
| 2004/0178360 A1 * | 9/2004 | Maezawa et al. | 250/484.4 |

* cited by examiner

*Primary Examiner*—Richard L. Schilling
(74) *Attorney, Agent, or Firm*—Finnegan, Henderson, Farabow, Garrett & Dunner, L.L.P.

(57) ABSTRACT

A radiation image conversion panel comprising a support and a stimulable phosphor layer provided on the support, in which the stimulable phosphor layer is formed by a gas-phase growing method so that the layer thickness of not less than 50 μm and the surface of the support is composed of polyimide resin.

8 Claims, 1 Drawing Sheet

RADIATION IMAGE CONVERSION PANEL AND PRODUCTION METHOD THEREOF

FIELD OF THE INVENTION

The present invention relates to a radiation image conversion panel and a production method therefor.

BACKGROUND OF THE PRESENT INVENTION

Hitherto so-called radiation method utilizing silver salt has been applied to obtain a radiation image. On the other hand, a method for imaging a radiation image without the use of the silver salt has been developed. Namely, a method is disclosed in which the radiation penetrated through a subject is absorbed by a phosphor and then the phosphor is excited by a kind of energy so that the energy accumulated in the phosphor is emitted as fluorescence light, and the fluorescence light is detected to form an image.

Concretely, a radiation image conversion method is known in which a panel composed of a support and a stimulable phosphor layer provided on the support is used and one or both of visible light and infrared rays are used (refer to U.S. Pat. No. 3,859,527).

As the radiation image conversion method using stimulable phosphors displaying higher luminance and sensitivity, for example, the radiation image conversion method employing $BaFX:Eu^{2+}$ type phosphor, in which X is Cl, Br or I, described in Japanese Patent Application Open to Public Inspection, hereinafter referred to as Japanese Patent Application O.P.I. No. 59-75200, the radiation image conversion method employing alkali halide phosphor described in Japanese Patent Application O.P.I. No. 61-72087, and the alkali halide phosphors containing $Tl^+$ and $Ce^{3+}$, $Sm^{3+}$, $Eu^{3+}$, $Y^{3+}$, $Ag^+$ or $Mg^{2+}$ as co-activator described in Japanese Patent Application O.P.I. Nos. 61-73786 and 61-73787 are developed.

Further in recent years, a radiation image conversion panel having higher sharpness is required in the field of analysis of diagnostic images. As a means to improve the sharpness, it has been tried to control the shape of the stimulable phosphor itself for improving the sharpness.

As one of such the trials, the method described in Japanese Patent Application O.P.I. No. 61-142497 is employed, in which a stimulable phosphor layer composed of pseudo-columnar block formed by accumulating the stimulable phosphor on a support having fine pattern of unevenness.

Moreover, the following methods have been proposed, the method described in Japanese Patent Application O.P.I. No. 61-142500 using the radiation image conversion panel having the stimulable phosphor layer in which the stimulable phosphor was accumulated on a support having fine patterns to form columnar blocks and cracks between the columnar blocks are developed by a shock treatment; the method described in Japanese Patent Application O.P.I. No. 62-39737 employing a radiation image conversion panel having the stimulable phosphor layer which cracks are formed from the surface side to form a pseudo-columnar structure, and the method described in Japanese Patent Application O.P.I. No. 62-110200 in which a stimulable phosphor layer having cavities is formed by vapor deposition and the cavities are developed by a heat treatment to form cracks.

Furthermore, Japanese Patent Application O.P.I. No. 2-58000 proposes a radiation image conversion panel having a stimulable phosphor layer composed of slender columnar crystal is formed by a gas-phase growing method or a gas-phase accumulation method on a support so that the columnar crystals are formed at a designated angle with the normal line of the support.

Recently, a radiation image conversion panel employing stimulable phosphor principally composed of alkali halide such as CsBr activated by Eu is proposed and high X-ray conversion efficiency, which cannot be obtained by usual methods, can be obtained by the use of Eu as the activator.

The layer formation by a vapor deposition is necessary to form the CsBr:Eu fluorescent layer. In the vapor deposition layer formation, a precision layer thickness distribution can be realized by high accurate arrangement of the substrate and the vapor deposition source considering the physical positions of them.

However, the requirements for improving the luminance and the sharpness are not satisfied by such the radiation image conversion panel having the stimulable phosphor layer formed by the gas-phase growing method, and further improvement has been demanded.

Recently, a high power semi-conductor laser emitting a wavelength of near 680 nm is frequently used as the stimulating energy source since the apparatus can be made compact. However, the transmittance of light of such the wavelength is low in the radiation image conversion panel according to the foregoing techniques, therefore problems is caused in the improvement of the sharpness since the stimulating light tend to be scattered in the stimulable phosphor layer. Moreover, a problem of localization of Eu in the CsBr:Eu caused by scattering of Eu since the thermal diffusion of Eu considerably occurs and the vapor pressure of Eu under vacuum is high. Accordingly, the method of vapor deposition and the material of the substrate are become important with respect to the uniformity of the layer.

The uniformity of adhesion between the substrate and the phosphor layer is important for forming a thick layer of a large area to improve the property of the panel. When a resin exists on the surface of the support, volatile ingredients are evaporated on the occasion of the formation of the phosphor layer so that the vacuum degree is varied and the variation of the layer is resulted since various kinds of solvents and volatile compositions derived from the production process are contained in the resin.

SUMMARY OF THE INVENTION

An object of the present invention is to provide a radiation image conversion panel displaying a high uniformity of the luminance, high luminance and high sharpness, and a production method of the radiation image conversion panel.

The above object of the present invention can be attained by the followings.

1. A radiation image conversion panel comprising a support and a stimulable phosphor layer provided on the support wherein at least one stimulable phosphor layer is formed by a gas-phase growing method so as to have a layer thickness of not less than 50 μm, and the surface of the support is composed of polyimide resin.

2. The radiation image conversion panel described in 1, in which of the stimulable phosphor layer contains a stimulable phosphor comprising an alkali halide represented by Formula 1 as the principal substance:

$$M^1X \cdot aM^2X'_2 \cdot bM^3X''_3 : eA \qquad \text{Formula 1}$$

Wherein $M^1$ is an alkali metal selected from the group consisting of Li, Na, K, Rb and Cs; $M^2$ is an alkali metal other than $M^1$ selected from the group consisting of Li, Na, K, Rb and Cs; $M^3$ is a trivalent metal selected from the group consisting of Y, La, Ce, Pr, Nd, Pm, Sm, Eu, Gd, Tb, Dy, Ho, Er, Yb and Lu; X, X' and X" are each a halogen selected from the group consisting of F, Cl, Br and I; A is a rare-earth metal element selected from the group consisting of Eu, Tb, In, Cs, Ce, Tm, Dy, Pr, Ho, Nd, Yb, Er, Gd, Lu, Sm and Y; and a, b and e are each a value within the range of $0 \leq a < 0.5$, $0 \leq b < 0.5$ and $0 < e \leq 0.2$, respectively.

3. The radiation image conversion panel described in 2, in which the stimulable phosphor layer has a layer thickness of from 50 μm to 20 mm.

4. The radiation image conversion panel described in 2, in which the value of a is $0 \leq a < 0.01$.

5. The radiation image conversion panel described in 2, in which the value of b is $0 \leq b \leq 0.01$.

6. The radiation image conversion panel described in 2, in which the value of e is $0 < e \leq 0.1$.

7. The radiation image conversion panel described in 1, in which the support has at least one layer of polyimide formed by imidizing treatment at a temperature of from 200 to 300° C.

8. A method for producing the support to be employed in the radiation image conversion panel described in 1, in which at least two kinds of monomer are co-deposited to form a layer.

9. A method for producing the support to be employed in the radiation image conversion panel described in 1, in which a stimulable phosphor layer adhering layer, the stimulable phosphor layer and a protective layer are each formed by a vapor deposition process.

DETAILED DESCRIPTION OF THE INVENTION

Figure 1:
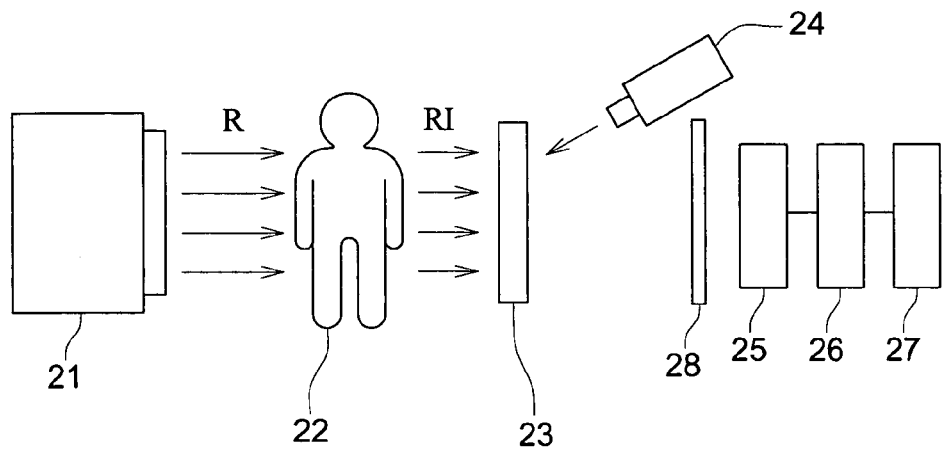
FIG. 1 is a schematic drawing displaying the constitution of an example of the radiation image conversion panel according to the present invention.

The present invention is described in detail below.

It is found by the inventor that a radiation image conversion panel having high uniformity of the luminance and displaying high luminance and high sharpness can be obtained when the radiation image conversion panel has a stimulable phosphor layer provided on a support in which at least one stimulable phosphor layer is formed by a gas-phase growing method so as to have a layer thickness of not less than 50 μm and the surface of the support is composed of polyimide resin.

It is preferable for enhancing the effects of the present invention that the stimulable phosphor layer contains the stimulable phosphor principally comprised of alkali halide represented by the foregoing Formula 1 and has a layer thickness of from 50 μm to 20 mm, and the support has a layer of polyimide formed by polyimidization at a temperature of from 200 to 300° C. It is referable in the layer forming process on the support that the polyimide layer is formed by vapor co-deposition of at least two kinds of monomers, and that the contact layer for the stimulable phosphor layer, the stimulable phosphor layer and the protective layer are entirely formed by the vapor deposition process.

The stimulable phosphor to be employed in the present invention is described in detail below. In the present invention, the stimulable phosphors principally comprised of alkali halide represented by Formula 1 are preferred. In Formula 1, $M^1$ is at least one kind of alkali metal selected from the group consisting of Li, Na, K, Rb and Cs, and an alkali-earth metal selected from Rb and Cs is preferable and Cs is more preferable, $M^2$ is at least one kind of alkali metal other than M1 selected from the group consisting of Li, Na, K, Rb and Cs. $M^3$ is a kind of three-valent selected from the group consisting of Y, La, Ce, Pr, Nd, Pm, Sm, Eu, Gd, Tb, Dy, Ho, Er, Tm, Yb and Lu. Among them, a three-valent metal selected from Y, Ce, Sm, Eu, Al, La, Gd and Lu is preferably employed.

X, X' and X" are each at least one kind of halogen selected from F, Cl, Br and I. A kind of halogen selected from F, Cl and Br is preferable from the viewpoint of the improvement of the luminance of the light emitted by stimulation from the stimulable phosphor. One selected from Br and I is more preferably employed.

In Formula 1, the value of b is $0 \leq b < 0.5$, and preferably $0 \leq b \leq 0.01$.

The stimulable phosphor relating to the present invention represented by Formula 1 is prepared, for example, by the following production method.

To a carbonate as the raw material of the stimulable phosphor, an acid, HI, HBr, HCl or HF, is added so as to make the following composition and mixed and stirred. Then the resultant is filtered at the neutral point, and the moisture of the filtrate is removed by evaporation to prepare the following crystals.

(a) One or more kinds of NaF, NaCl, NaBr, NaI, KF, KCl, KBr, KI, RbF, RbCl, Rb Br, RbI, CsF, CsCl, CsBr and CsI;

(b) One or more kinds of $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$; and (c) a raw material of activator containing a metal selected from the group consisting of Eu, Tb, In, Cs, Ce, Tm, Dy, Pr, Ho, Nd, Yb, Er, Gd, Lu, Sm, Y, Tl, Na, Ag, Cu and Mg.

In the stimulable phosphor stoichiometrically represented by Formula 1, "a" is $0 \leq a < 0.5$ and preferably $0 \leq a < 0.01$, "b" is $0 \leq b < 0.5$ and preferably $0 \leq b \leq 0.01$, and "e" is $0 < e \leq 0.2$ and preferably $0 < e \leq 0.1$.

The raw materials (a) through (c) are weighed so that the mixture composition satisfies the above conditions and dissolved in purified water. On this occasion, the raw materials may be sufficiently mixed by a mortar, a ball mill or a mixer mill.

To the resultant solution, a designated acid is added to control the pH value, and the moisture is evaporated out.

Thus obtained mixture of the raw materials is put into a heat resistive vessel such as a quartz crucible or an alumina crucible and burned in an electric furnace. A burning temperature of from 500 to 1000° C. is suitable. The suitable burning time is usually from 0.5 to 6 hours even though the time may be varied depending on the charging amount of the raw materials and the burning temperature. As the atmosphere of the burning, a weak reduction atmosphere such as a nitrogen gas atmosphere with a small amount of hydrogen gas and a carbon dioxide gas atmosphere with a small amount of carbon mono-oxide, a neutral atmosphere such as a nitrogen gas atmosphere and an argon gas atmosphere, and a weak oxidation atmosphere containing a small mount of oxygen gas are preferable. The luminance of the emitted fluorescent light can be further increased by that the phosphor once burned under the above conditions is putout from the electric furnace and powdered; thereafter the powder of the burned materials is re-charged into the heat resistive vessel and re-burned in the electric furnace under the same conditions. On the occasion of that the burned materials is cooled from the burning temperature to the room temperature, the burned materials may be cooled in the weak reduction or the neutral atmosphere even though the desired phosphor can be obtained by taking out the burned material from the electric furnace and standing in air atmosphere to be cooled. The luminance of the emitted light by stimulation of the phosphor can be further raised by the burned materials are moved in the electric furnace from the heating portion to the cooling portion to be rapidly cooled in the weak reduction, neutral or weak oxidation atmosphere.

The stimulable phosphor layer relating to the present invention is formed by a gas-phase growing method, also called as a gas-phase accumulation method.

As the gas-phase growing method for the stimulable phosphor, a vapor deposition method, a spattering method and an ion-plating method are applicable.

In the vapor deposition method as the first method, the support is set in a vapor deposition apparatus and air in the apparatus is exhausted until the vacuum degree is attained to about $1.333 \times 10^{-4}$ Pa. And then at least one of the foregoing stimulable phosphors is vaporized by heating and deposited by a resistor heating method or an electron beam method to grow the stimulable phosphor to desired thickness.

Thus the stimulable phosphor layer containing no binder is formed. It is possible in the foregoing vapor deposition process that the vapor deposition is divided into plural times to form the stimulable phosphor layer. Moreover, it is also possible in the vapor deposition process that plural materials are co-evaporated by using plural resistor heating devices or electron beams to synthesis the objective stimulable phosphor on the support while forming the layer thereof.

After the vapor deposition, a protective layer is provided on the side of the support opposite to the stimulable phosphor layer to produce the radiation image conversion panel according to the present invention. A procedure is applicable in which the stimulable phosphor layer is formed on the protective layer and then the support is provided.

In the above method, the subject for vapor deposition such as the support or the protective layer may be cooled or heated according to necessity. The stimulable phosphor layer may be subjected to a heat treatment after the finish of the vapor deposition. Moreover, gas such as $O_2$ or $H_2$ may be introduced in the vapor deposition process for performing reaction vapor deposition.

In the spattering method as the second method, the support is set in a spattering apparatus the same means as that in the vapor deposition method and air in the apparatus is once exhausted to reduce the pressured by a vacuum degree of $1.33 \times 10^{-4}$ Pa, and then inactive gas such as Ar and Ne is introduced as gas for spattering into the spattering apparatus so as to make the gas pressure in the apparatus to $1.333 \times 10^{-1}$ Pa. The spattering is performed by using the stimulable phosphor as the target to grow the stimulable phosphor layer by the designated thickness on the support surface.

In the spattering process, various treatments may be applied the same as those in the vapor deposition process.

A chemical vapor deposition (CDV) method is applicable as the third method, and an ion plating method is applicable as the fourth method.

The growing rate of the stimulable phosphor layer in the gas-phase growing method is preferably from 0.05 to 300 µm/minute. When the growing rate is less than 0.05 µm/minute, the production efficiency of the radiation image conversion panel according to the present invention is become too low. When the growing rate exceeds 300 µm/minute, the growing rate is difficultly controlled. When the radiation image conventional panel is prepared by the foregoing vapor deposition method and the spattering method, the packing density of the stimulable phosphor can be increased and preferable radiation image conversion panel in the sensitivity and the resolving power can be obtained since the binder is not present.

Though the dry thickness of the stimulable phosphor layer my be varied depending on the purpose of the use and the kind of the stimulable phosphor, a thickness of not less than 50 µm is necessary to obtain the effects of the present invention, and is preferably from 50 to 300 µm, more preferably from 100 to 300 µm, and further preferably from 150 to 300 µm.

When the stimulable phosphor layer is prepared by the gas-phase growing method, it is preferable that the temperature of the support on which the stimulable phosphor layer is formed is preferably set at a temperature of not less than 100° C., more preferably not less than 150° C., and particularly preferably from 150 to 400° C.

The stimulable phosphor layer relating to the radiation image conversion panel of the present invention is formed by growing of the stimulable phosphor represented by Formula 1 in gas-phase, and it is preferable that the stimulable phosphor forms columnar crystals.

The stimulable fluorescent materials represented by Formula 1 are employed to form the layer of columnar stimulable phosphor, among them CsBr type phosphor is particularly preferred.

Thus formed stimulable phosphor layer on the support is superior in the directionality since the layer contains no binder, and the stimulating light and the emission light by stimulation have high directivity. Consequently, the thickness of the fluorescent layer can be made larger than that of the layer of the radiation image conversion panel having a dispersion type stimulable phosphor layer in which the stimulable phosphor is dispersed in the binder. Furthermore, the sharpness of the image is raised because the scatter of the stimulating light in the stimulable phosphor layer is reduced.

A filling substance may be filled in the space between the columnar crystals to reinforce the stimulable phosphor layer. Moreover, a substance having high light absorbency and a substance having high reflectivity may be filled in the space. Such the filling is effective to reinforce the layer and to reduce the diffusion in the horizontal direction of the stimulating light incident into the stimulable phosphor layer.

The high reflective substance is a substance having a high reflectance to the stimulating light of 500 to 900 nm, particularly 600 to 800 nm. As such the substance, a metal such as aluminum, magnesium, silver and indium, a white pigment and a colorant having green through red color are employable.

The white pigment can reflect the light emitted by stimulation. Examples of the white pigment are anatase type and rutile type $TiO_2$, MgO, $PbCO_3.Pb(OH)_2$, $BaSO_4$, $Al_2O_3$, M(II)FX in which M(II) is at least one of Ba, Sr and Ca, and X is at least one of Cl and Br, $CaCO_3$, ZnO, $Sb_2O_3$, $SiO_2$, $ZrO_2$, lithopone ($BaO_4.ZnS$), magnesium silicate, a basic silisulfate, basic lead phosphate and aluminum silicate. The sensitivity of the radiation image conversion panel can be considerably increased by these white pigments because they have high hiding power and high refractivity and easily scatter the emitted light by reflection and refraction.

As the substance with high absorbency, for example, carbon, chromium oxide, nickel oxide, iron oxide and a blue colorant are employed. Carbon also absorbs emitted light stimulation.

Organic colorants and inorganic colorants are either usable. Examples of the organic colorant are Sabon Fast Blue 3G, manufactured by Hoechst Co., Ltd., Erstrol Bryl Blue N-3RL, manufactured by Sumitomo Kagaku Co., Ltd., D & G Blue No. 1, manufactured by National Aniline Co., Ltd., Spirit Blue, manufactured by Hodogaya Kagaku Co., Ltd., Oil Blue No. 603, manufactured by Orient Co., Ltd., Quitone Blue A, manufactured by Ciba-Geigy Co., Ltd., Aisen Carotin Blue GLH, manufactured by Hodogaya Kagaku Co., Ltd., Lake Blue AFH, manufactured by Kyowa Sangyo Co., Ltd., Primocyanine 6GX, manufactured by Inahata Sangyo Co., Ltd., Bryl Acid Green 6BH, manufactured by Hodogaya Kagaku Co., Ltd., Cyan Blue BNRCS, manufactured by Toyo Ink Co., Ltd., and Lionyl Blue SL, manufactured by Toyo Ink Co., Ltd. Metal complex colorants such as Color Index Nos. 24411, 23160, 74180, 74200, 22800, 23154, 23155, 24401, 14830, 15050, 15760, 15707, 17941, 74220, 13425, 13361, 13420, 11835, 74140, 74380, 74350 and 74460 are also employable. Examples of the inorganic colorant are Prussian blue, cobalt blue, cerulean blue, chromium oxide, and $TiO_2$—ZnO—Co—NiO type pigments.

Support

Various kinds of glass, polymers and metals are employed as the support of the radiation image conversion panel of the present invention. Preferable examples of the support are a palate of glass such as that of quartz, borosilicate glass, and chemically strengthen glass, a film of plastic such as that of cellulose acetate, polyester, poly(ethylene terephthalate), polyamide, polyimide, triacetate and polycarbonate, and a sheet of metal such as that of aluminum, iron and copper. The surface of these supports may be smooth or matted for raising the adhesive property with the stimulable phosphor.

In the present invention, it is characterized in that the surface of the support is composed of polyimide resin. The polyimide resin layer can be formed on the support by a process in which the resin is coating and drying (wet process), two or more kinds of monomer are co-deposited by vapor deposition and imidized by heating (dry process) or a precursor of polyimide resin was deposited by vapor deposition and imidized by heating (dry process).

Among them, the dry processes are preferred. In the formation of CsBr:Eu layer, it is essential to inhibit the variation of the vacuum degree for uniformly forming the layer to raise the crystallization degree. In the support on which the polyimide resin layer is formed by the dry process, variation of the vacuum degree on the occasion of formation of the CsBr:Eu phosphor can be inhibited as the support layer contains no moisture and no volatile ingredient. In the method in which the precursor of polyimide resin is deposited by vapor deposition and imidized by heating treatment at a temperature from 200 to 300° C., the physical property of the support such as thermal expansion coefficient can be controlled by controlling the imidizing amount. Consequently, contact force of the CsBr phosphor layer onto the polyimide resin layer can be increased so that the uniformity of the luminance in a large area an be raised. It is preferable that the formation of the polyimide resin layer on the support, an adhesive layer (phosphor contacting layer), the CsBr:Eu layer and the protective layer are all continuously performed. By such the method, the hygroscopic CsBr crystal can be held in the vacuum of reduced pressure condition to prevent the degradation of the layer and the radiation image conversion panel having high luminance uniformity can be formed.

In the present invention, an adhesive layer (phosphor contacting layer) may be previously provided according to necessity for improving the adhesiveness between the support and the stimulable phosphor layer. The thickness of the support is usually from 80 to 2,000 μm and further preferably from 80 to 1,000 μm from the viewpoint of easiness of handling even though the thickness may be varied depending on the material of the support.

Protective Layer

The stimulable phosphor layer according to the present invention may have a protective layer.

The protective layer either may be formed by directly coating a protective layer coating liquid on the stimulable phosphor or by adhering of a separating formed protective layer onto the stimulable phosphor layer. As the material of the protective layer, usual materials for protective layer are employable such as cellulose acetate, nitrocellulose, poly (methyl methacrylate), poly(vinyl butyral), poly(vinyl formal), polycarbonate, polyester, poly(ethylene phthalate), polyethylene, poly(vinylidene chloride), Nylon, poly)ethylene fluoride), poly(trifluoroethylen chloride), tetrafluoroethylene-hexafluoropropylene copolymer, vinylidene chloride-vinyl chloride copolymer and vinylidene chloride-acrylonitrile copolymer. A transparent glass plate can also be employed as the protective layer. The protective layer may be formed by accumulation of an inorganic material such as SiC, $SiO_2$, SiN and $Al_2O_3$ by the vapor deposition method or the spattering method. The thickness of the protective layer is usually from 0.1 to 2,000 μm.

FIG. 1 is a schematic drawing of an example of the constitution of the radiation image conversion panel according to the present invention. In FIG. 1, 21 is a radiation generating apparatus; 22 is a subject; 23 is a radiation image conversion panel having a layer of the phosphor stimulable by visible or infrared rays containing a stimulable phosphor; 24 is a stimulating light source for releasing the radiation latent image on the radiation image conversion panel as light; 25 is a photo-electric conversion device for detecting the light emitted from the radiation image conversion panel 23; 26 is an image reproduction apparatus for reproducing the photo-electric converted signals detected by the photo-electric conversion device 25; 27 is a display device for displaying the reproduced image; and 28 is a filter for cutting the reflected light from the stimulating light source 24 and passing only the light emitted from the radiation image conversion panel. FIG. 1 shows an example to obtain a transmission radiation image. When the radiation is emitted from the subject 22 itself, the radiation generating apparatus is unnecessary. The means after the photo-electric conversion device 25 are not limited to those described in FIG. 1 as long as the means can be reproduce the photo-information as an image in any state.

When the subject 22 is positioned between the radiation generating apparatus 21 and the radiation image conversion panel 23, as shown in FIG. 1, and radiation R is irradiated, the radiation R is penetrate through the subject 22 according to the radiation transmittance of each parts of the subject and the transmission image RI depending on the intensity of the radiation is fallen on the radiation image conversion panel. The incident transmission image RI is absorbed by the stimulable phosphor of the radiation image conversion panel 23 and electrons and/or positive holes in the number of proportional to the radiation amount absorbed in the stimulable phosphor layer are generated and accumulated at the trap level of the stimulable phosphor. Thus a latent image constituted by the accumulation of the energy of the transmitted radiation image is formed. Then the latent image is appeared by stimulation by light energy. Namely, the stimulable phosphor is irradiated by the light source irradiating visible or infrared rays so as to release the electrons and/or the positive holes accumulated at the trap level and to emit the energy as light. It is desirable that the light emitted from the stimulable phosphor layer has the spectrum distribution at a wavelength region as short as possible because the reflex light of the estimation light and the light emitted from the stimulable phosphor should be separated and the photo-electric conversion device receiving the light emitted from the stimulable phosphor has high sensitivity to light energy of short wavelength of not more than 600 nm. The wavelength region of the light emitted from the stimulable phosphor relating to the present invention is from 300 to 500 nm, and the wavelength region of the estimating light is from 500 to 900 nm. Accordingly, the above condition is satisfied. Recently, a semiconductor laser is utilized as the stimulating light source for reading the image of the radiation image conversion panel accompanied with the progress of down sizing of the diagnosis apparatus. The semiconductor laser has high power output and is suite for compact apparatus, and the wavelength of such the laser is 680 nm. The stimulable phosphor employed in the radiation image conversion panel of the present invention shows extremely high sharpness when stimulated by light of 680 nm.

The stimulable phosphors relating to the present invention are each emit light having the principal peak at a wavelength of not more than 500 nm, and the emitted light is easily separated form the stimulating light and agrees with the spectral sensitivity of the light receiving device. Therefore, the emitted light is received with high efficiency so that the sensitivity of the image receiving system can be increased.

As the stimulating light source 24, a light source generating light containing the wavelength for stimulating the stimulable phosphor employed in the radiation image conversion panel 23. More preferable result can be obtained by the use of laser light because the optical system can be simplified and the light emission efficiency can be raised since the intensity of the stimulating light can be increased.

As the laser, for example, He—Ne laser, a He—Cd laser, an Ar ion laser, a Kr ion laser, an $N_2$ laser, a YAG laser and its second harmonics, a ruby laser, a semiconductor laser, various kinds of dye laser and a metal vapor laser such as a copper vapor laser are employable. Though a continuously oscillation laser such as the He—Ne laser and Ar ion laser are usually preferable, a pulse oscillation laser can be employed by synchronizing the pulse with the scanning time per pixel. When the separation is carried out by the method utilizing the delay of the light emission such as that described in Japanese Patent O.P.I. Application No. 59-22046, the pulse oscillation laser is preferable than the continuous oscillation laser with modulation.

Among the above-described various laser light source, the semiconductor laser is particularly preferred since the semiconductor laser is compact, low in the cost and no modulator is necessary.

The filter 28 is decided by the combination of the wavelength of the light emitted from the stimulable phosphor contained in the radiation image conversion panel 23 and that of the stimulating light of the light source 24.

For example, in the case of the preferable combination for practical use such as that the wavelength of the estimating light is from 500 to 900 nm and that of the emitted light is from 300 to 500 nm, purple to blue glass filters such as C-39, C-40, V-40, V-42 and V-44, each manufactured by Toshiba Co., Ltd., 7-54, 7-59, manufactured by Corning Co., Ltd., BG-1, BG-3, BG-25, BG-37 and BG-38, manufactured by Spectrofilm Co., Ltd., are employable. A filter having an optional characteristic can be selected by the use of an interference filter. As the photo-electric conversion device 25, any devices capable of converting the variation of light to variation of electric signals are applicable such as a phototube, a photomultiplier, a photodiode, a phototransistor, a solar cell and a photoconductive element.

EXAMPLES

The present invention is described below referring examples; the embodiment of the present invention is not limited to the examples.

Example

<<Preparation of Supports 1 Through 8>>

Support 1 was prepared by forming an alumina layer having a thickness of 10 μm on a crystallized glass plate having a thickness of 1 mm, manufactured by Nihon Denki Glass Co., Ltd., employing the vapor deposition apparatus described in Japanese Patent O.P.I. Application No. 62-110200.

Support 2 was prepared by forming a polycarbonate layer having a thickness of 10 μm by coating and drying a methylene chloride/methanol solution of bis-phenol type polycarbonate resin having a viscosity average molecular weight of 40,000 on the crystallized glass plate having a thickness of 1 mm, manufactured by Nihon Denki Glass Co., Ltd.

Supports 3 and 4 were prepared by forming a polyimide layer by coating and drying a solution of polyimide resin Capton, manufactured by Toray Co., Ltd., on the crystallized glass plate having a thickness of 1 mm, manufactured by Nihon Denki Glass Co., Ltd., and by heated each at 350° C. and 300° C., respectively.

Support 5 was prepared by forming a polyimide layer by co-depositing polymeritic acid anhydride and oxydianiline by heating each at 200 to 240° C., and 180 to 200° C., respectively, on crystallized glass plate having a thickness of 1 mm, manufactured by Nihon Denki Glass Co., Ltd. and imidizing by heating at 300° C.

Supports 6 through 8 were prepared by forming a polyimide layer by depositing polyamide acid 1 by heating on the crystallized glass plate having a thickness of 1 mm, manufactured by Nihon Denki Glass Co., Ltd., and imidizing by heating each at 300° C., 250° C. and 200° C., respectively.

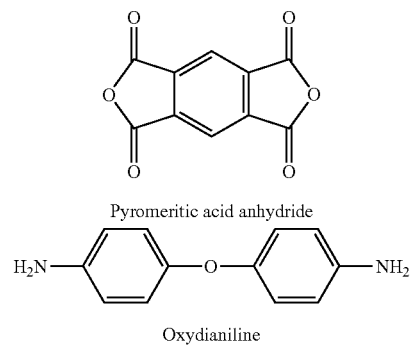

Pyromeritic acid anhydride

Oxydianiline

-continued

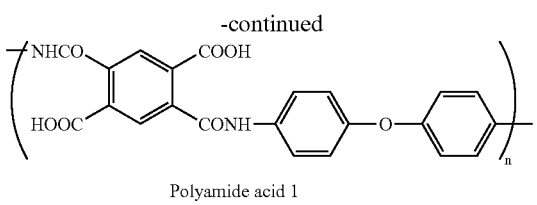

Polyamide acid 1

<<Preparation of Radiation Image Conversion Panels 1 Through 8>>

Figure 2:
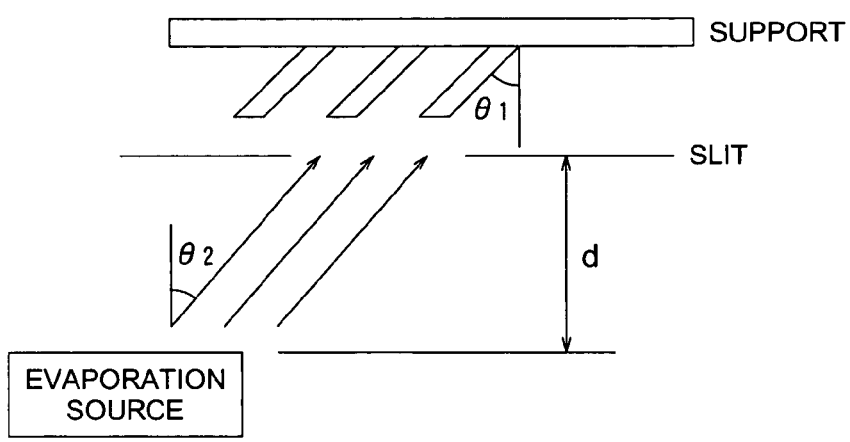
FIG. 2 is a schematic drawing displaying an example of the vapor deposition apparatus for producing the stimulable phosphor layer on the support by vapor deposition.

A stimulable phosphor layer containing a CsBr:Eu stimulable phosphor was formed on the treated surface of Support 1 by the vapor deposition apparatus shown in FIG. 2 in which θ1 and θ2 were each 5°.

In the vapor deposition apparatus shown in FIG. 2, an aluminum slit was used and the distance d between the support and the slit was set at 60 cm. The deposition was performed while conveying the support in the direction parallel with the support and the deposition was controlled so that the thickness of the stimulable phosphor layer is become to 300 µm.

On the occasion of the vapor deposition, the support is set in the vapor deposition apparatus and the phosphor material CsBr:Eu shaped by pressing was put into a crucible cooled by water, and the air in the vapor deposition apparatus was once exhausted and then the vacuum degree was adjusted to 0.133 Pa by introducing $N_2$, thereafter the deposition was performed while maintaining the temperature at 350° C. The deposition was finished when the thickness of the stimulable phosphor layer is attained at 300 µm, and the phosphor layer was subjected to a thermal treatment at 400° C. The edge portion of the support and a borosilicate glass protective layer was sealed by an adhesive agent in dry air atmosphere. Thus radiation image conversion panel 1 having a closed structure was prepared.

Radiation image conversion panels 2 through 8 were prepared in the same manner as in the radiation image conversion panel 1 except that the support 2 through 8 were each employed in the place of the support 1, respectively.

The radiation image conversion panels 1 through 8 were subjected to the evaluation on the sharpness, luminance and luminance distribution. Evaluation results are listed in Table 1.

<<Evaluation of Sharpness>>

The sharpness of each of the above-prepared radiation image conversion panels was evaluated according to the modulation transfer function thereof.

The modulation transfer function was determined by the following procedure: a CTF chart was pasted on the radiation image conversion panel and 10 mR of X-ray of 80 kVp was irradiated; the distance between the subject was 1.5 m. Then the image of CFT was readout by scanning by a light beam having a diameter of 100 µm emitted by a semiconductor laser having a wavelength of 680 nm and the power of 40 mW on the panel. The value shown in the table is the sum of the MTF values at 2.01 p/mm.

<<Evaluation of Luminance and Luminance Distribution>>

The luminance was evaluated using Regius 350 manufactured by Konica Corp.

The panel was irradiated by X-ray emitted from a tungsten tube applying 80 kVp and 10 mAs with a distance between the X-ray source and the panel of 2 m. After that, the panel was set in Regius 350 and the evaluation was performed with respect to thus obtained electric signals from the photomultiplier.

The distribution of the electric signals measured by the photomultiplier in the irradiated area of the panel surface was evaluated by relative values, and the standard deviation of them was calculated as the luminance distribution.

TABLE 1

| Radiation image conversion panel No. | Surface treatment of support | | | Luminance | MTF (%) | Luminance distribution | Remarks |
|---|---|---|---|---|---|---|---|
| | Material of support surface | Heating temperature (° C.) | Method | | | | |
| 1 | Al | — | — | 0.51 | 13 | 44 | Comp. |
| 2 | PC | — | — | 0.42 | 11 | 65 | Comp. |
| 3 | PI | 350 | wet | 1.22 | 25 | 18 | Inv. |
| 4 | PI | 300 | wet | 1.43 | 28 | 12 | Inv. |
| 5 | PI | 300 | dry | 1.54 | 42 | 6 | Inv. |
| 6 | PI | 300 | dry | 1.33 | 45 | 4 | Inv. |
| 7 | PI | 250 | dry | 1.56 | 43 | 3 | Inv. |
| 8 | PI | 250 | dry | 1.65 | 48 | 4 | Inv. |

Comp.: Comparative
Inv.: Inventive
Al: Alumina
PC: Polycarbonate resin
PI: Polyimide resin
wet: Wet process
dry: Dry process It is cleared from Table 1 that the radiation image conversion panels according to the present invention are superior in the luminance, sharpness (MTF characteristic), and luminance distribution to the comparative panels.

What is claimed is:

1. A method of producing a radiation image conversion panel comprising the steps of:
    (a) evaporating at least two kinds of monomers by heating;
    (b) co-depositing the two monomers on a surface of a support;
    (c) polymerizing the deposited monomers by heating so as to convert the deposited monomers into a polyimide resin; and
    (d) depositing a stimulable phosphor layer on the polyimide resin using gas-phase-growing method such that the thickness of the stimulable phosphor layer is not less than 50 µm.

2. A method of producing a radiation image conversion panel comprising the steps of:
    (a) evaporating at least two kinds of monomers by heating;
    (b) co-depositing the two monomers on a surface of a support;
    (c) polymerizing the deposited monomers by heating so as to convert the deposited monomers into a polyimide resin;
    (d) forming a stimulable phosphor adhering layer on the polyimide resin by a vapor deposition method;
    (e) depositing a stimulable phosphor layer on the stimulable phosphor adhering layer using a gas-phase-growing method, such that the thickness of the stimulable phosphor layer is not less than 50 µm; and
    (f) forming a protective layer on the stimulable phosphor layer by a vapor deposition method.

3. The method of claim 1, wherein the stimulable phosphor layer contains a stimulable phosphor comprising an alkali halide represented by formula 1:

$$M^1x \cdot aM^2X'_2 \cdot bM^3X''_3 : eA \qquad \text{Formula 1}$$

wherein $M^1$ is an alkali metal selected from the group consisting of Li, Na, K, Rb, and Cs; $M^2$ is an alkali metal other than $M^1$ selected from the group consisting of Li, Na, K, Rb, and Cs; $M^3$ is a trivalent metal selected from the group consisting of Y, La, Ce, Pr, Nd, Pm, Sm, Eu, Gd, Tb, Dy, Ho, Er, Yb, and Lu; X, X', and X" are each a halogen selected from the group consisting of F, Cl, Br and I; A is a rare-earth metal element selected from the group consisting of Eu, Tb, In, Cs, Ce, Tm, Dy, Pr, Ho, Nd, Yb, Er, Gd, Lu, Sm, and Y; and a, b, and e are each a value within the range of $0 \leq a < 0.5$, $0 \leq b < 0.5$, and $0 < e \leq 0.2$, respectively.

4. The method of claim 3, wherein the stimulable phosphor layer has a layer thickness of from 50 μm to 20 mm.

5. The method of claim 4, wherein the value of a is $0 \leq a < 0.01$.

6. The method of claim 4, wherein the value of b is $0 \leq b < 0.01$.

7. The method of claim 4, wherein the value of e is $0 < e \leq 0.1$.

8. The method of claim 1, wherein step (c) is conducted at a temperature of from 200 to 300° C.

* * * * *